United States Patent
Umezu

(10) Patent No.: US 9,804,407 B2
(45) Date of Patent: Oct. 31, 2017

(54) IMAGE SHAKE CORRECTION APPARATUS HAVING EXPOSED DAMPING MEMBER AND INSTALLATION REGION OF DAMPING MEMBER OVERLAPPING WITH BALL OR SPHERE CONTACT SURFACE IN AN OPTICAL AXIS DIRECTION

(71) Applicant: CANON KABUSHIKI KAISHA, Tokyo (JP)

(72) Inventor: Takuji Umezu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/044,920

(22) Filed: Oct. 3, 2013

(65) Prior Publication Data

US 2014/0098421 A1  Apr. 10, 2014

(30) Foreign Application Priority Data

Oct. 5, 2012  (JP) .................................. 2012-222850

(51) Int. Cl.
*G02B 27/64* (2006.01)
*G02B 7/10* (2006.01)
*H04N 5/232* (2006.01)

(52) U.S. Cl.
CPC .......... *G02B 27/646* (2013.01); *G02B 7/102* (2013.01); *H04N 5/2328* (2013.01); *H04N 5/23258* (2013.01); *G02B 27/64* (2013.01)

(58) Field of Classification Search
CPC .............................. G02B 27/64; G02B 27/646

(Continued)

(56) References Cited

U.S. PATENT DOCUMENTS 6,064,827 A *  5/2000  Toyoda ........................... 396/55
2007/0121225 A1*  5/2007  Shin ....................... G11B 7/093
359/813

(Continued)

FOREIGN PATENT DOCUMENTS

JP    2008286929 A    11/2008
JP    2008292900 A    12/2008

(Continued)

OTHER PUBLICATIONS

Office Action issued in Japanese Appln. No. 2012-222850 mailed Aug. 2, 2016. English translation provided.

(Continued)

*Primary Examiner* — Stephone B Allen
*Assistant Examiner* — Ryan S Dunning
(74) *Attorney, Agent, or Firm* — Rossi, Kimms & McDowell LLP

(57) ABSTRACT

An image shake correction apparatus includes a first fixing member; a movable member configured to correct the image shake, and configured to hold an optical element; a plurality of spherical members that are movable; a biasing member configured to apply a biasing force through the spherical member in the optical axis direction; a second fixing member that is disposed on the opposite side of the optical axis direction; and a plurality of damping members disposed in the second fixing member that suppresses vibration resulting from movement of the movable member. Either one of the first fixing member or the movable member includes a contact surface configured to make contact with the spherical member, and the maximum movable range of the contact surface overlaps with at least a portion of the installation region of the damping member in the optical axis direction.

7 Claims, 8 Drawing Sheets

(58) Field of Classification Search
USPC ..... 348/207.99, 208.99, 208.4, 208.5, 208.7, 348/208.11, 208.12–208.16; 359/554, 359/557; 396/52, 55
See application file for complete search history.

(56) References Cited

U.S. PATENT DOCUMENTS

| | | | | |
|---|---|---|---|---|
| 2008/0055421 | A1* | 3/2008 | Kimura | G02B 27/646 348/208.99 |
| 2008/0251738 | A1* | 10/2008 | Figueroa | G02B 27/646 250/504 R |
| 2010/0079604 | A1* | 4/2010 | Washisu | G02B 7/08 348/208.4 |
| 2010/0118402 | A1* | 5/2010 | Washisu | 359/557 |
| 2011/0050921 | A1* | 3/2011 | Noto | G03B 5/00 348/208.7 |

FOREIGN PATENT DOCUMENTS

| | | |
|---|---|---|
| JP | 2009-145771 A | 7/2009 |
| JP | 2010-286810 A | 12/2010 |
| JP | 2011-053241 A | 3/2011 |
| JP | 2012-113319 A | 6/2012 |
| JP | 5-192998 B2 | 5/2013 |

OTHER PUBLICATIONS

Office Action issued in Japanese Patent Application No. 2012222850, dated Oct. 25, 2016. English translation provided.

* cited by examiner

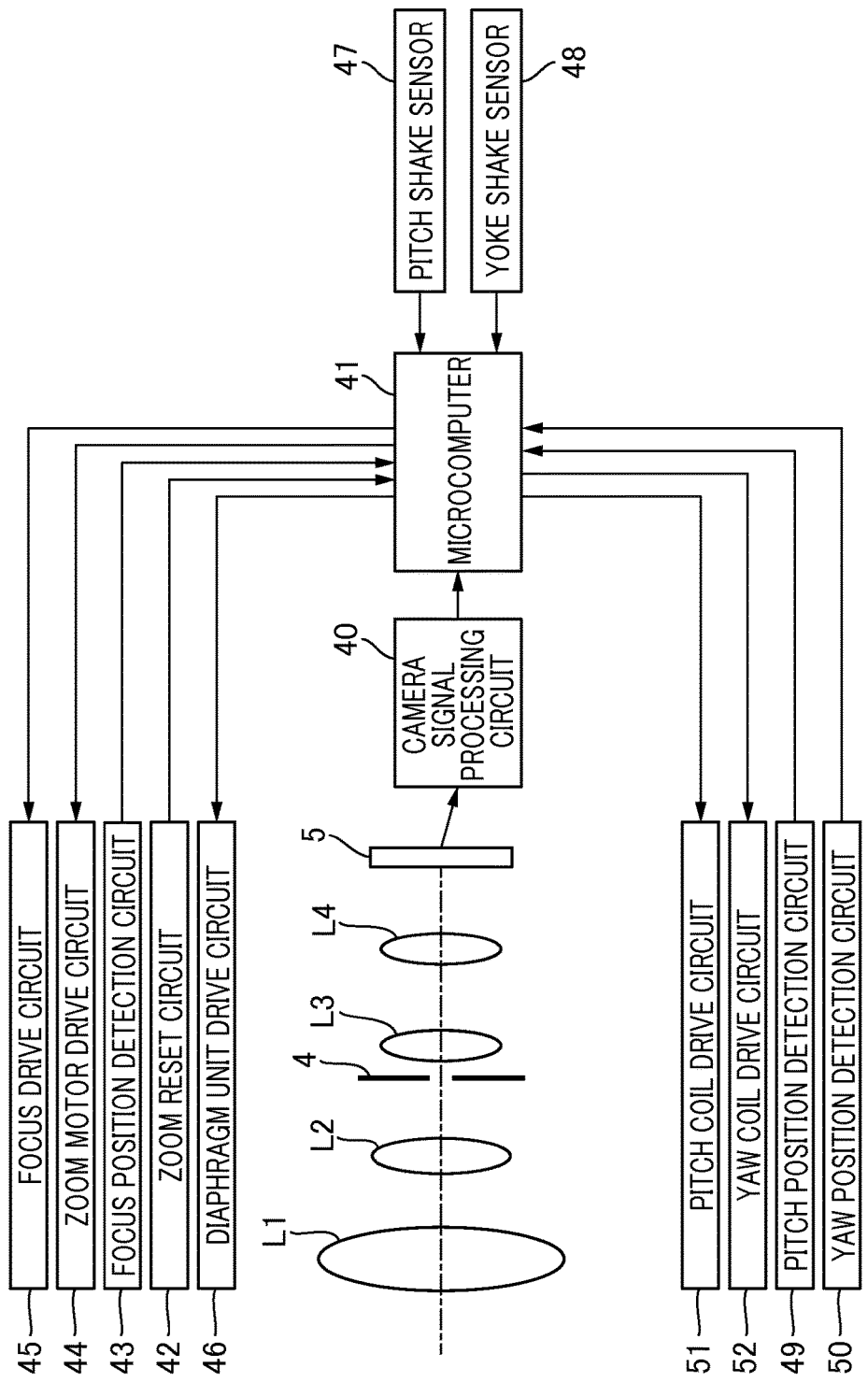

IMAGE SHAKE CORRECTION APPARATUS HAVING EXPOSED DAMPING MEMBER AND INSTALLATION REGION OF DAMPING MEMBER OVERLAPPING WITH BALL OR SPHERE CONTACT SURFACE IN AN OPTICAL AXIS DIRECTION

BACKGROUND OF THE INVENTION

Field of the Invention

The present disclosure relates to an image shake correction apparatus, and to an optical device using the same.

Description of the Related Art

Conventionally, an image shake correction apparatus has been proposed that is configured to prevent image shake that tends to be produced by hand shake during an imaging operation when using an optical device such as a digital camera or the like. For example, this image shake correction apparatus has a configuration for detecting an image shake condition using a detection means in relation to the lens barrel provided in the optical device, and displacing an image shake correction lens (or image capture element) in a shift configuration in a plane that is orthogonal to the optical axis based on the detection result. In this case, image shake can be eliminated by displacing the correction lens in a direction that absorbs the principal vibration in the plane orthogonal to the optical axis to correct a deviation in the image forming position resulting from image shake. The correction lens in this type of image shake correction apparatus is moved by use of an electromagnetic force configured to act between a coil and a magnet. Japanese Patent Application Laid-Open No. 2009-145771 discloses an image shake correction apparatus that uses three balls to determine a position of the correction lens in the optical axis direction, and disposes three springs that are inclined with reference to the diameter in order to bias the balls. Furthermore, the image shake correction apparatus includes a damping member to suppress the effect of resonance.

However, the image shake correction apparatus disclosed in Japanese Patent Application Laid-Open No. 2009-145771 is not designed so that the thrust generated by the coil and the magnet overcomes the pulling force of the spring in a direction perpendicular to the optical axis due to the fact that the spring is disposed in a configuration to pull in an inclined direction. This configuration leads to increase the size of the actuator that includes the coil and the magnet. In order to prevent an increase in the size of the actuator, it has been proposed for example to configure the direction of spring pull with reference to the direction of the optical axis and not the direction perpendicular to the optical axis. However, it is not possible to avoid a size increase of the diameter in this type of image shake correction apparatus when for example, three balls, three springs, and furthermore two damping members are all disposed in a plane that is perpendicular to the optical axis in a configuration to avoid mutual interference.

SUMMARY OF THE INVENTION

The present disclosure is proposed in light of the above circumstances, and provides an image shake correction apparatus that is useful for size reduction in the diameter direction.

The present disclosure relates to an image shake correction apparatus includes a first fixing member; a movable member configured to correct image shake by moving in a plane that is orthogonal to an optical axis relative to the first fixing member, and configured to hold an optical element; a plurality of spherical members that are movable being sandwiched between the first fixing member and the movable member; a biasing member configured to apply a biasing force through the spherical member in the optical axis direction between the first fixing member and the movable member; a second fixing member that is disposed on the opposite side of the optical axis direction with reference to the first fixing member in a state where the movable member is sandwiched between the first fixing member and the second fixing member; and a plurality of damping members disposed in the second fixing member and suppressing vibration resulting from movement of the movable member by connection with a portion of the movable member. Either one of the first fixing member or the movable member includes a contact surface configured to make contact with the spherical member, and the maximum movable range of the contact surface overlaps with at least a portion of the installation region of the damping member in the optical axis direction.

The present disclosure provides an image shake correction apparatus that is useful for size reduction in the diameter direction.

Further features of the present invention will become apparent from the following description of exemplary embodiments (with reference to the attached drawings).

BRIEF DESCRIPTION OF THE DRAWINGS

FIG. 2 illustrates an optical system, and a control system configured to control the respective constituent elements of the optical system.

BRIEF DESCRIPTION OF THE EMBODIMENTS

Hereinafter, preferred embodiments of the present invention will be described with reference to the drawings.

Figure 1:
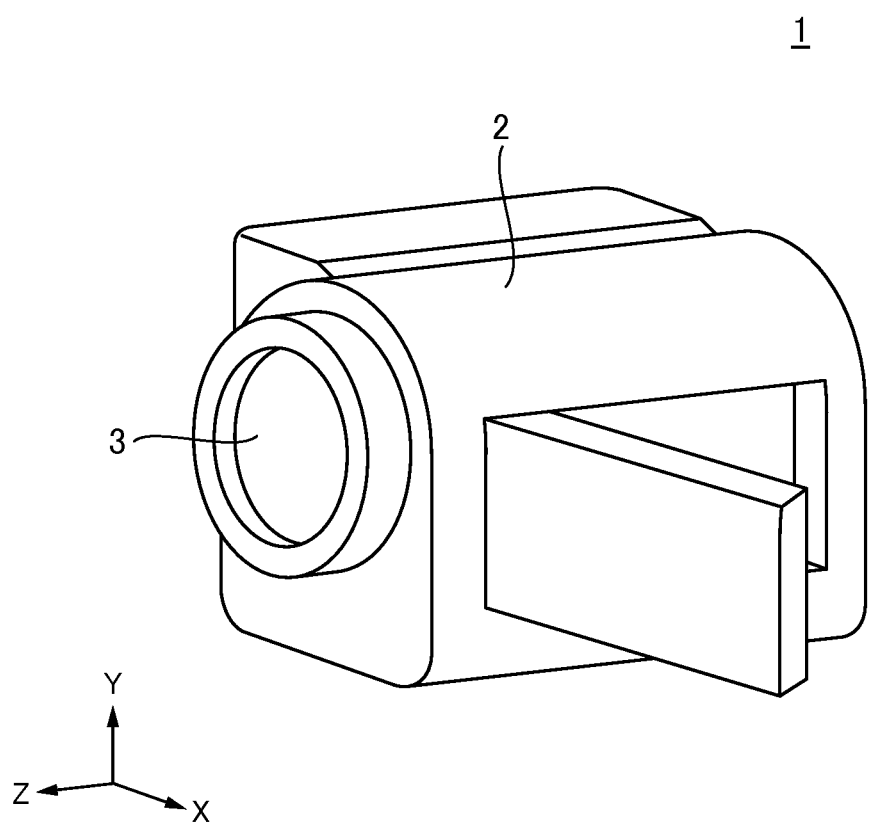
FIG. 1 illustrates the external appearance of an optical device that includes an image shake correction apparatus according to an embodiment.

Firstly, an optical device that applies the image shake correction apparatus according to an embodiment of the present disclosure will be described. The image shake correction apparatus according to the present embodiment can be mounted on an optical device such as a conversion lens unit or imaging apparatus such as a video camera, digital still camera, or the like. In the following description of the present embodiment, an example will be described of a video camera which is integrally formed with a lens barrel in which the image shake correction apparatus is included in an inner portion of the lens barrel. In the following figures, the Z axis is taken to be the direction with respect to the imaged body in the optical axis direction of the lens barrel, the Y axis is the direction (pitch direction) perpendicular to a plane that is vertically configured relative to the Z axis, and the X axis is the horizontal direction (yaw direction). FIG. 1 is a perspective view that illustrates the external appearance of a video camera 1 that applies an image shake correction apparatus according to the present embodiment. The video camera 1 includes a camera main body 2 and a lens barrel 3 that is integrally connected with the camera main body 2.

FIG. 2 illustrates an optical system that is configured from a plurality of optical elements (optical element group) included in the lens barrel 3, and a control system contained in the camera main body 2, and configured to control the operation of the respective constituent elements of the lens barrel 3. Firstly, in sequence from the imaged body (direction of light incidence), the optical system contained in the lens barrel 3 includes a first lens group L1, a second lens group L2, an optical amount adjustment unit 4, a shift lens (third lens group) L3, and a fourth lens group L4. For example, the optical system can adjust the zoom (magnification) or focus (focusing), or the like. An imaging element 5 is provided on the image plane side (light emission side) of the lens barrel 3 (optical system) in an inner portion of the camera main body 2. The imaging element 5 executes photoelectric conversion of the image of the imaged body that is formed by the respective lenses L1 to L4 of the first to fourth groups. A CCD image sensor for example may be adopted as the imaging element 5. The imaging element 5 may also be configured as another type of imaging element such as a CMOS image sensor, or the like. The image shake correction apparatus according to the present embodiment that includes a shift lens L3 will be described below. Thereafter, the control system related to the image shake correction apparatus will be described.

Figure 3A:
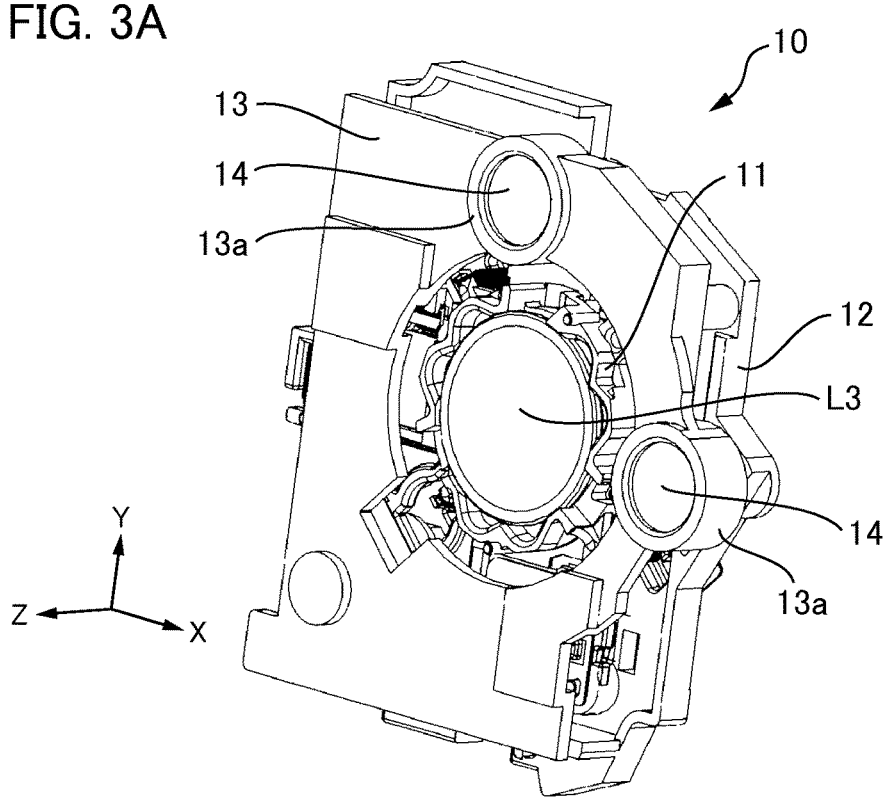
FIGS. 3A and 3B illustrate a perspective view of the external appearance of the image shake correction apparatus according to the embodiment.
Figure 3B:
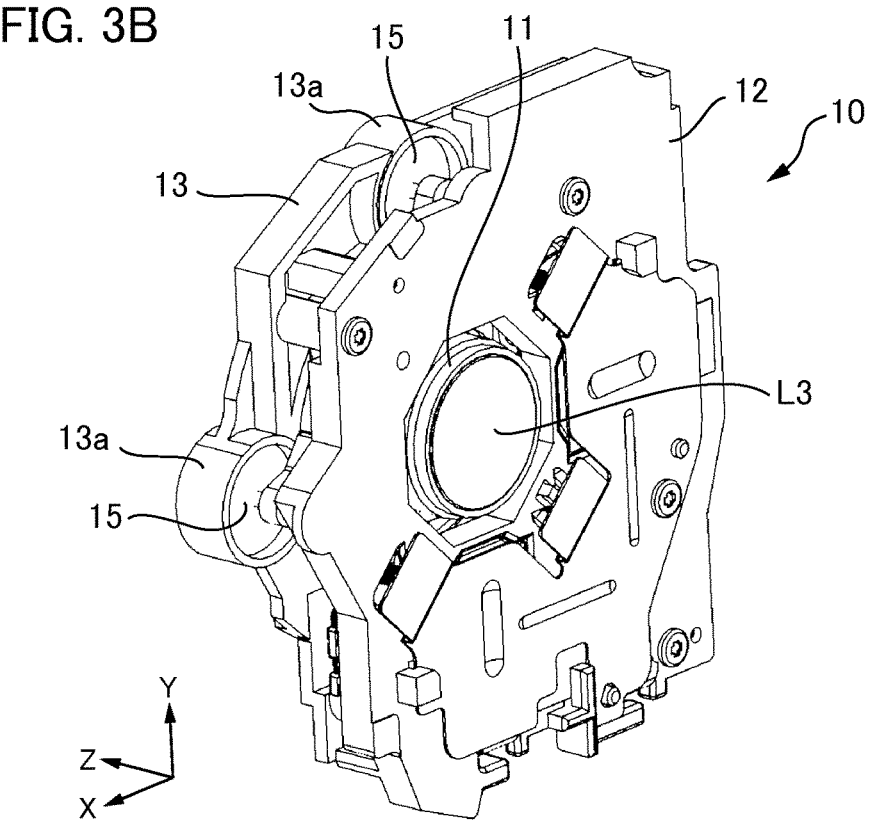

FIGS. 3A and 3B illustrate a perspective view of the external appearance of the image shake correction apparatus 10 according to the embodiment. In particular, FIG. 3A is seen from the imaged body side, and FIG. 3B is seen from the image plane side. Firstly, the image shake correction apparatus 10 includes a shift lens barrel (movable member) 11 that holds the shift lens L3, and a shift base lens barrel (first fixing member) 12 that forms the base when moving the shift lens barrel 11 in a plane (XY plane) that is orthogonal to the optical axis. Furthermore, the image shake correction apparatus 10 includes a damping member mounting unit (second fixing member) 13 in which the shift lens barrel 11 is disposed, and that is fitted from the opposite side to the optical axis direction relative to the shift base lens barrel 12. The damping member mounting unit 13 includes a cylindrical unit 13a at two positions at which a transparent sheet 14 and damping member 15 described below are disposed.

Figure 4A:
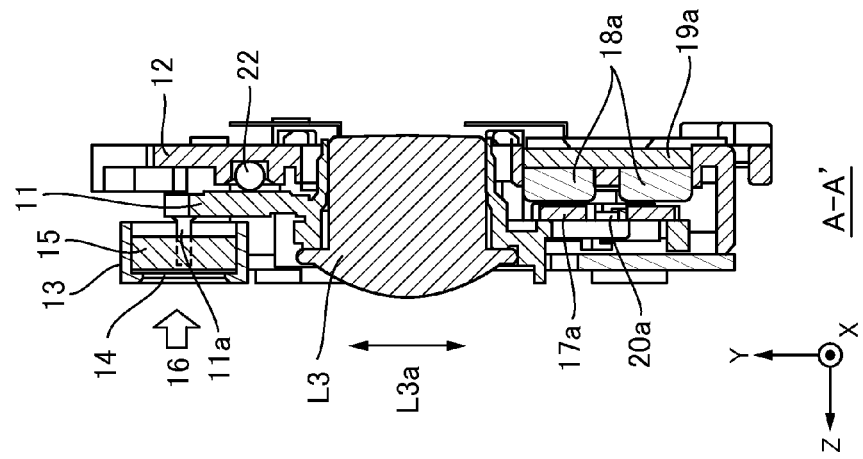
FIGS. 4A and 4B illustrate a plan view and a sectional view of the configuration of the image shake correction apparatus according to the embodiment.
Figure 4B:
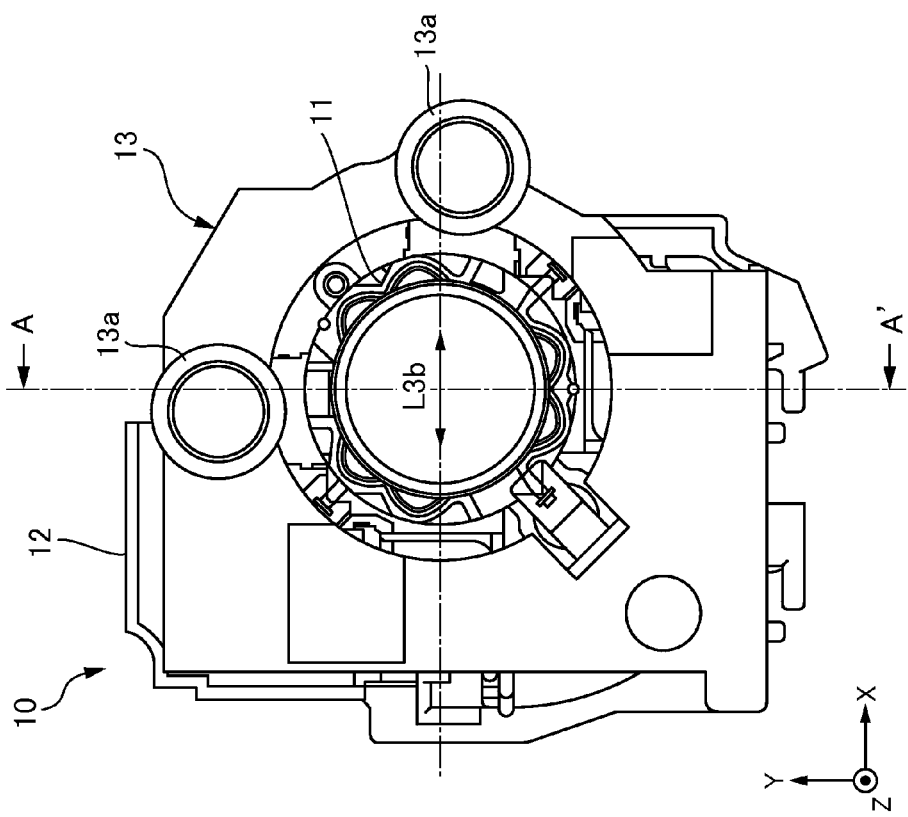

FIGS. 4A and 4B illustrate a plan view and a sectional view of the configuration of the image shake correction apparatus 10. In particular, FIG. 4A is a plan view seen from the imaged body side, and FIG. 4B illustrates a sectional plane along the line A-A' in FIG. 4A. The damping member 15 is configured to impart a damper effect and thereby suppress the effect of vibration (for example, resonance) resulting from an external disturbance, or the like, and in other words, enhance control characteristics for example. The damping member 15 may be configured as a viscoelastic body in the present embodiment, and in particular, may be configured as an ultraviolet-light cured silicone gel that exhibits superior environmental resistance, and ease of assembly. In this configuration, the damping member 15 is assembled as a transparent sheet 14, that is a PET sheet for example, in relation to the cylindrical unit 13a, then cylindrical shafts 11a (a part of the movable member) formed at two positions on the shift lens barrel 11 are inserted, and curing is performed using irradiation of ultraviolet light from the direction of the arrow 16. The viscoelastic body that is used is not limited to an ultraviolet-light cured silicone gel. Furthermore, the damping member 15 is not limited to a viscoelastic body, and for example may be configured as a mechanical mechanism that uses various processes such as application of pressure.

In particular, in the present embodiment, the image shake correction apparatus 10 adopts a configuration in which respective drive coils for pitch and yaw are connected and fixed to the shift lens barrel 11, that is to say, a moving coil type of configuration is adopted. In this case, a pitch drive coil 17a is connected and fixed to the shift lens barrel 11 by use of an adhesive (not illustrated) as a drive unit (actuator) for the pitch direction. The pitch drive magnets 18a are arranged as two magnets having unipolar magnetization with respect to the direction of the optical axis and disposed in series in a direction that is perpendicular with respect to the optical axis at a position facing the pitch drive coil 17a, and fixed to the shift base lens barrel 12. Furthermore, the pitch yaw member 19a cuts off the magnetic flux produced by the pitch drive magnets 18a, and is fixed to the shift base lens barrel 12. When a voltage is applied to the pitch drive coil 17a, a drive force is produced in a direction L3a that is perpendicular to the optical axis between the pitch drive coil 17a and the pitch drive magnets 18a. The drive force is controlled by the direction (polarity) and the dimension of the voltage applied to the pitch drive coil 17a. On the other hand, in the same manner as the yaw direction, the image shake correction apparatus 10 includes a yaw drive coil 17b, a yaw drive magnet 18b and a yaw yoke member 19b as a yaw direction drive unit (reference is made to FIG. 5A and FIG. 5B). When a voltage is applied to the yaw drive coil 17b, a drive force is produced in a direction L3b that is perpendicular to the optical axis between the yaw drive coil 17b and the yaw drive magnet 18b. The drive force may be controlled by the direction and the dimension of the voltage applied to the yaw drive coil 17b. Furthermore, the image shake correction apparatus 10 includes a pitch position detection sensor 20a and a yaw position detection sensor 20b. The sensor 20a is disposed at a fixed position on an inner side of the pitch drive coil 17a, and the sensor 20b is disposed at a fixed position on an inner side of the yaw drive coil 17b. Both the sensor 20a and the sensor 20b may be configured as a Hall element or the like.

Figure 5A:
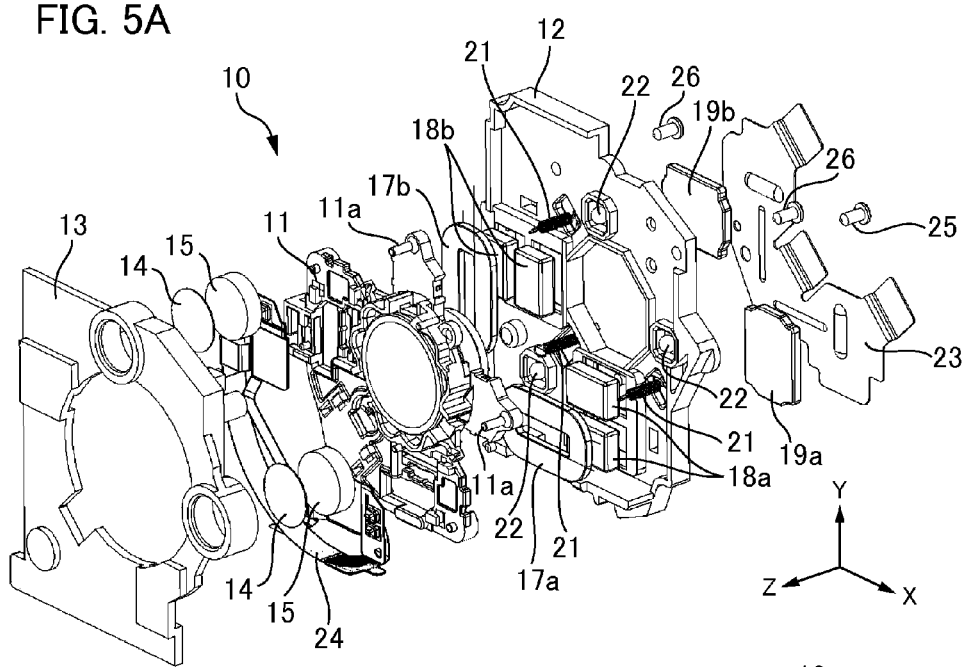
FIGS. 5A and 5B illustrate a partial perspective view of the configuration of the image shake correction apparatus according to the embodiment.
Figure 5B:
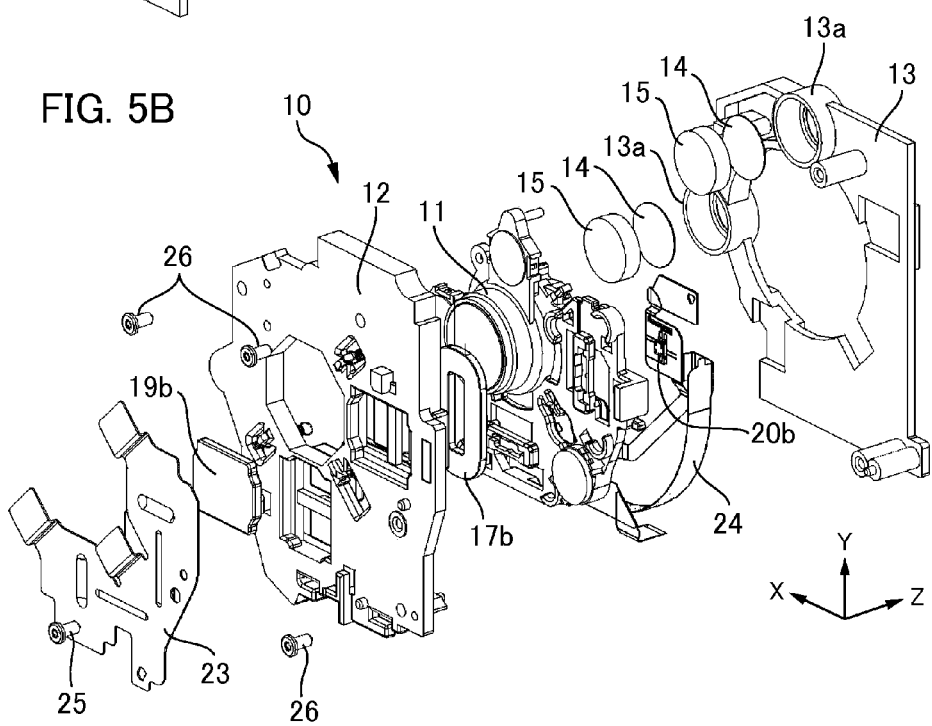

FIGS. 5A and 5B illustrate a partial perspective view of the configuration of the image shake correction apparatus 10. In particular, FIG. 5A is a partial view seen from the imaged body side, and FIG. 5B is a partial view seen from the image plane side. In the XY plane, the image shake correction apparatus 10 includes three coil springs (biasing members) 21 on the periphery of the shift lens L3 and three balls (spherical members) 22. The coil springs 21 in the present embodiment are springs configured to exert a pulling force, and are disposed coaxially to the optical axis direction. Both ends of the coil spring 21 are supported so that one pulls on the shift lens barrel 11 and the other pulls on the shift base lens barrel 12. In this configuration, the coil spring 21 exerts a biasing force on the respective balls 22, and the balls 22 are sandwiched between the shift lens barrel 11 and the shift base lens barrel 12, and the shift lens barrel 11 is moved in the XY plane by only the rolling friction of the balls 22. Furthermore, the image shake correction apparatus 10 includes a yoke pressing plate 23 and a flexible printed base plate 24. The yoke pressing plate 23 is a member configured to prevent detachment of the pitch yoke member 19a or the yaw yoke member 19b due to an impact, and is threadably fixed to the shift base lens barrel 12 using screws 25. The flexible printed base plate 24 is mounted by soldering the pitch position detection sensor 20a and the yaw position detection sensor 20A. The flexible printed base plate 24 is configured with electrical conductive properties by soldering the coil terminal of the pitch drive coil 17a and the yaw drive coil 17b. In particular, the image shake correction apparatus 10 has a moving coil type configuration, and therefore the flexible printed base plate 24 is pulled through an arc from the shift lens barrel 11 to the shift base lens barrel 12, and is fixed to the shift base lens barrel 12. The three screws 26 in FIG. 5A and FIG. 5B are for the purpose of mounting (threadably fixing) the damping member mounting unit 13 relative to the shift base lens barrel 12.

As illustrated in FIG. 2, the control system configured in the inner portion of the camera main body 2 includes a camera signal processing circuit 40 and a micro-computer (hereinafter referred to as "the microcomputer") 41. The camera signal processing circuit 40 receives output signals from the imaging element 5 and processes various types of signals for conversion to an image signal. The microcomputer 41 executes the following types of processing operations. An image signal from the camera signal processing circuit 40 passes through the microcomputer 41, is displayed on a display (not illustrated), and is stored in a storage medium (semiconductor memory, optical disk, hard disk, magnetic tape, or the like). Firstly, the microcomputer 41 receives signals from the zoom reset circuit 42 that executes reference position detection of the second lens group L2, and from the focus position detection circuit 43 that detects the position of the fourth lens group L4. The microcomputer 41 refers to these signals, and controls a zoom motor drive circuit 44 or a focus drive circuit 45 to thereby execute zoom driving or focus driving of the optical system in the lens barrel 3. Then the microcomputer 41 controls the diaphragm unit drive circuit 46 based on the illumination signal component of the imaging signal from the camera signal processing circuit 40, and changes the aperture diameter of the light amount adjustment unit 4 to a size corresponding to a suitable light amount. Then the microcomputer 41 operates and controls the image shake correction apparatus 10 upon receipt of a shake signal from a pitch shake sensor 47 and a yaw shake sensor 48 such as a vibration gyro or the like that are mounted in the camera main body 2. The microcomputer 41 calculates the target drive position in the pitch and yaw directions of the shift lens L3 based on the shake signal. Furthermore, the microcomputer 41 receives information in relation to the position of the shift lens L3 (detection position) from the yaw position detection circuit 50 (connected to the yaw position detection sensor 20b) and the pitch position detection circuit 49 (connected to the pitch position detection sensor 20a). Then, the microcomputer 41 controls the application of current to the pitch drive coil 17a and the yaw direction coil 17b through the pitch coil drive circuit 51 and the yaw coil drive circuit 52 so that the detection position arrives as the target drive position. In this manner, the image shake correction apparatus 10 prevents movement on the imaging element 5 of the formed image of the imaged body even when the video camera 1 shakes, that is to say, the apparatus 10 can perform image shake correction.

Figure 6:
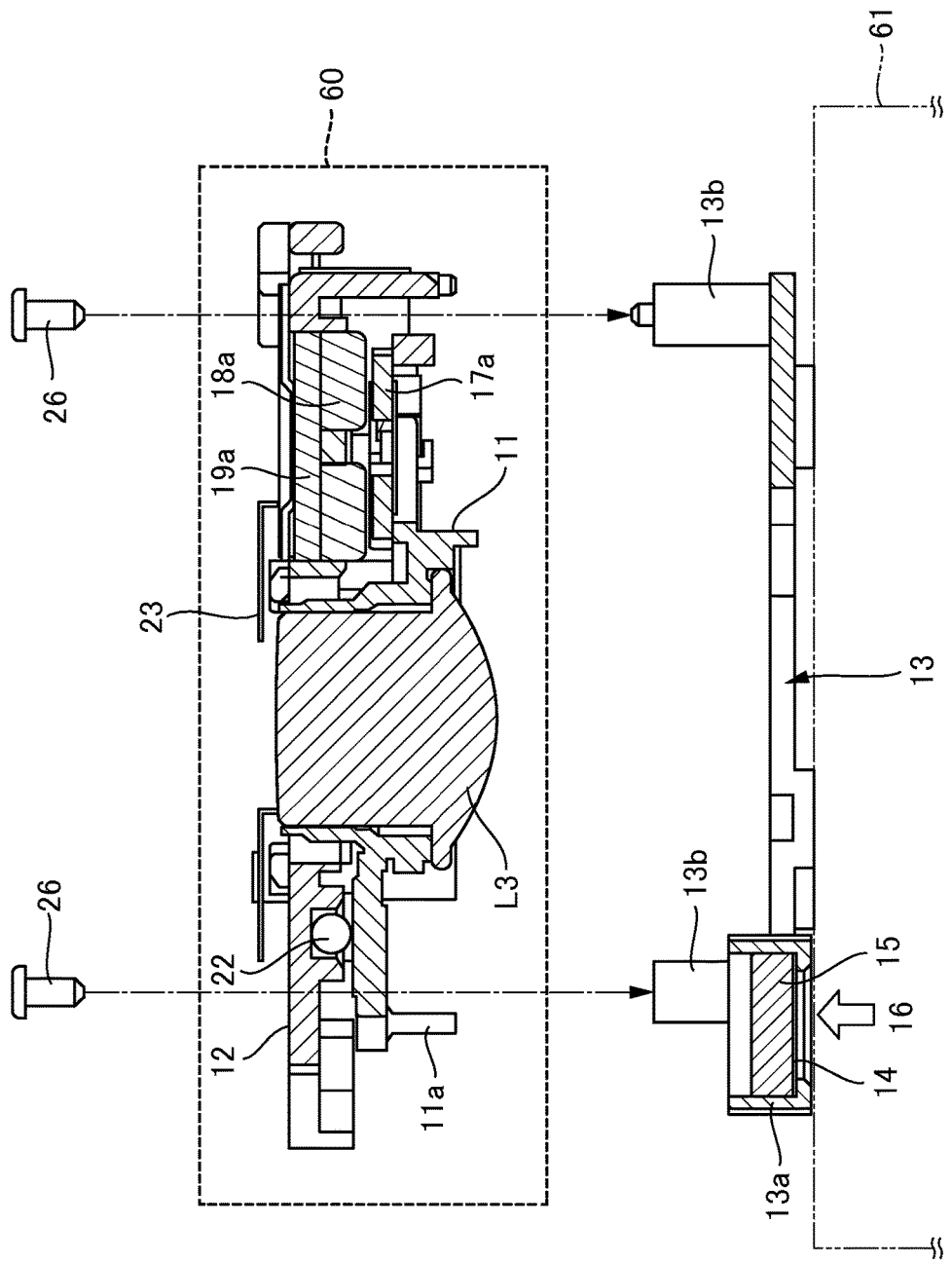
FIG. 6 describes the assembly sequence of the image shake correction apparatus according to the embodiment.

Next, the assembly sequence of the image shake correction apparatus 10 that has the above configuration will be described. FIG. 6 is a sectional view illustrating the main components of the configuration in a step during the assembly sequence of the image shake correction apparatus 10. Firstly, assembly of the movable unit 60 illustrated in FIG. 6 that configures the image shake correction apparatus 10 is executed. The respective drive coils 17a, 17b are adhered and fixed to the shift lens barrel 11. The flexible printed base plate 24, that is configured with a solder mounting for the position detection sensors 20a, 20b, is adhered and fixed to the shift lens barrel 11. Next, the shift lens barrel 11 is fitted to the shift base lens barrel 12, and at the same time the three coil springs 21 are fitted in a state in which the three balls 22 are disposed in advance on the shift base lens barrel 12 that fixes the drive magnets 18a, 18b and the respective yaw members 19a, 19b. The yoke pressing plate 23 is fixed by a screw 25 to the shift base lens barrel 12 to thereby complete the movable unit 60. Next, the damping member 15 is installed on the cylindrical unit 13a in the damping member mounting unit 13. Firstly, as illustrated in FIG. 6, the damping member mounting unit 13 is disposed on a horizontal pedestal 61 so that the side mounting the shift base lens barrel 12 has an upward configuration. Next, the transparent sheet 14 is laid onto the two cylindrical units 13a, and the damping member 15 that is an ultraviolet-light cured silicone gel is poured onto the transparent sheet 14. The ultraviolet-light cured silicone gel is configured in a state of a low-viscosity liquid during the pouring operation (prior to curing). Since the damping member mounting unit 13 is disposed on the pedestal 61 so that the opening of the cylindrical unit 13a has an upward configuration, leakage of the damping member 15 from the cylindrical unit 13a can be suppressed. Thereafter, the movable unit 60 and the damping member mounting unit 13 are mounted in a configuration in which two cylindrical shafts 11a formed on the shift lens barrel 11 are inserted (connected) relative to the damping member 15. Three boss units 13b are formed to threadably fix the shift base lens barrel 12 to the damping member mounting unit 13. Therefore, after assembly, the movable unit 60 and the shift base lens barrel 12 are fixed by threadable engagement of the three screws 26 to the boss units 13b. The damping member 15 is cured by irradiation using ultraviolet light from the direction of the arrow 16 as described above to thereby complete the assembly of the image shake correction apparatus 10.

Figure 7A:
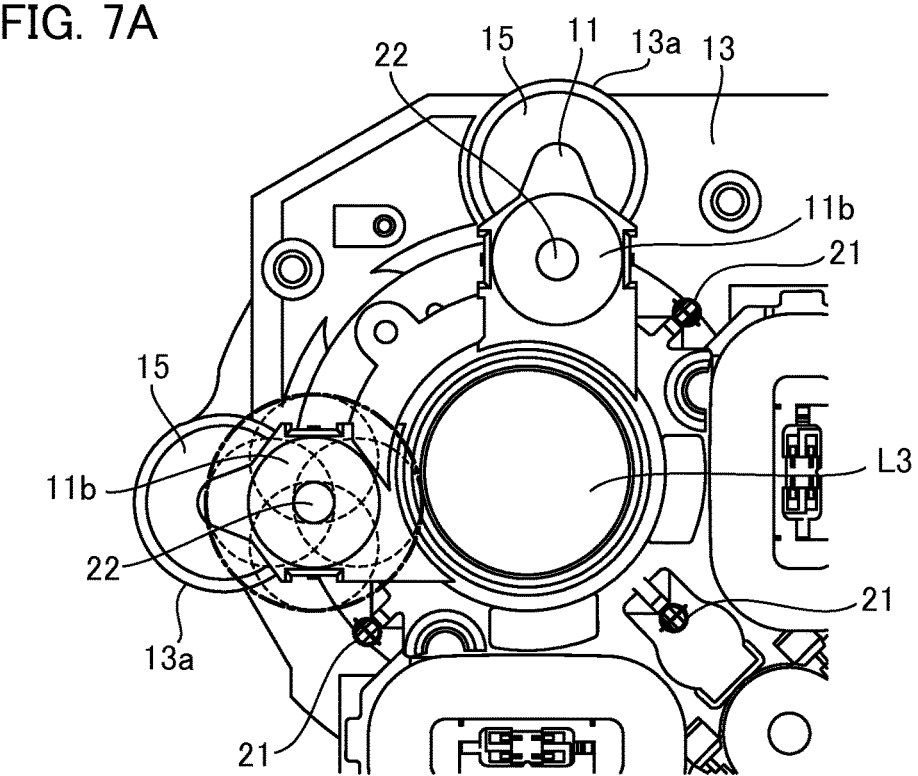
FIGS. 7A and 7B illustrate the positional relationship in the direction of the optical axis of a damping member mounting unit and a shift lens barrel.
Figure 7B:
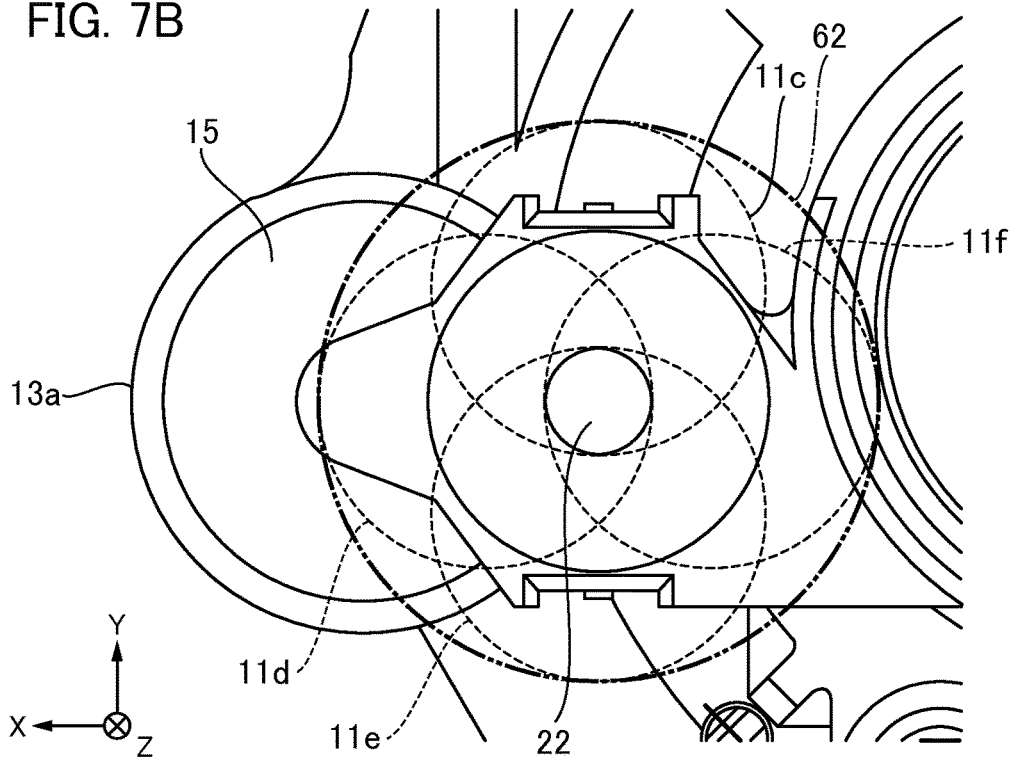

Next, the positional relationship of the respective constituent elements that configure the image shake correction apparatus 10 and the operation that is based on the positional relationship will be described. FIG. 7A and FIG. 7B are plan figures that illustrate the positional relationship in the direction of the optical axis of a damping member mounting unit 13 and a shift lens barrel 11 seen from the imaging plane side. In particular, FIG. 7A illustrates the positional relationship of the two damping members 15 and the balls 22 in proximity thereto relative to the shift lens L3. FIG. 7B is an enlarged view specifying the installation portion of one damping member 15 and ball 22 illustrated in FIG. 7A. The shift lens barrel 11 includes two contact surfaces (ball contact surfaces) 11b that make contact with the ball 22 and enable movement on the surface thereof. The contact surfaces 11b are part of the shift lens barrel 11 in the present embodiment. However, for example, a configuration is possible in which a metal plate or the like is provided on the shift lens barrel 11 as a separate member. Furthermore, the contact surface 11b in the figures is configured in a position at which the shift lens barrel 11 does not move, that is to say, the position at which the optical axis center of the shift lens L3 coincides with the optical axis center of the overall optical system of the lens barrel 3. The contact surface 11b may move in the XY plane in response to the movement of the shift lens barrel 11 relative to the damping member mounting unit 13 and the shift base lens barrel 12 provided as a fixed unit. More specifically, the contact surface 11b during maximum movement of the shift lens barrel 11 toward the plus side in the Y axis direction (upwardly in the figure) is positioned at the point 11c. In the same manner, the contact surface 11b during maximum movement of the shift lens barrel 11 toward the minus side in the X axis direction (left direction in the figure), the minus side in the Y axis direction (the downward direction in the figure), and the plus side in the X axis direction (the right direction in the figure) is positioned respectively at the points 11d, 11e, 11f. Therefore, as illustrated in FIG. 7B, the maximum movable range 62 of the contact surface 11b is the range expressed by the circle that includes the positions 11c to 11f. In the present embodiment, in a configuration in which the ball 22 is disposed on the image plane side of the shift lens barrel 11, and the damping member 15 is disposed on the imaged body side of the shift lens barrel 11, the maximum movable range 62 of the shift lens barrel 11 overlaps in the optical axis direction with at least a portion of the installation region of the damping member 15 in the cylindrical unit 13a.

Figure 8A:
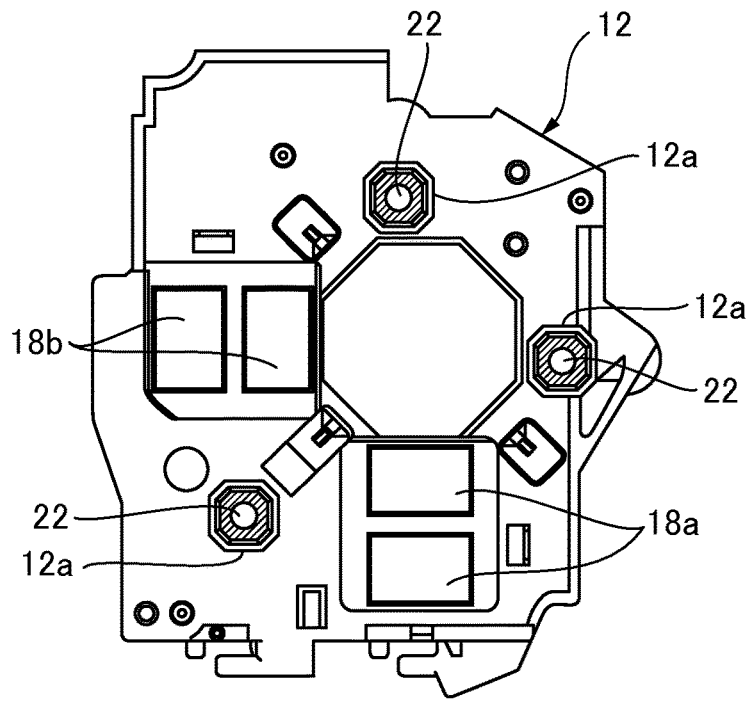
FIGS. 8A and 8B illustrate the positional relationship in the direction of the optical axis of the balls and a shift base lens barrel.
Figure 8B:
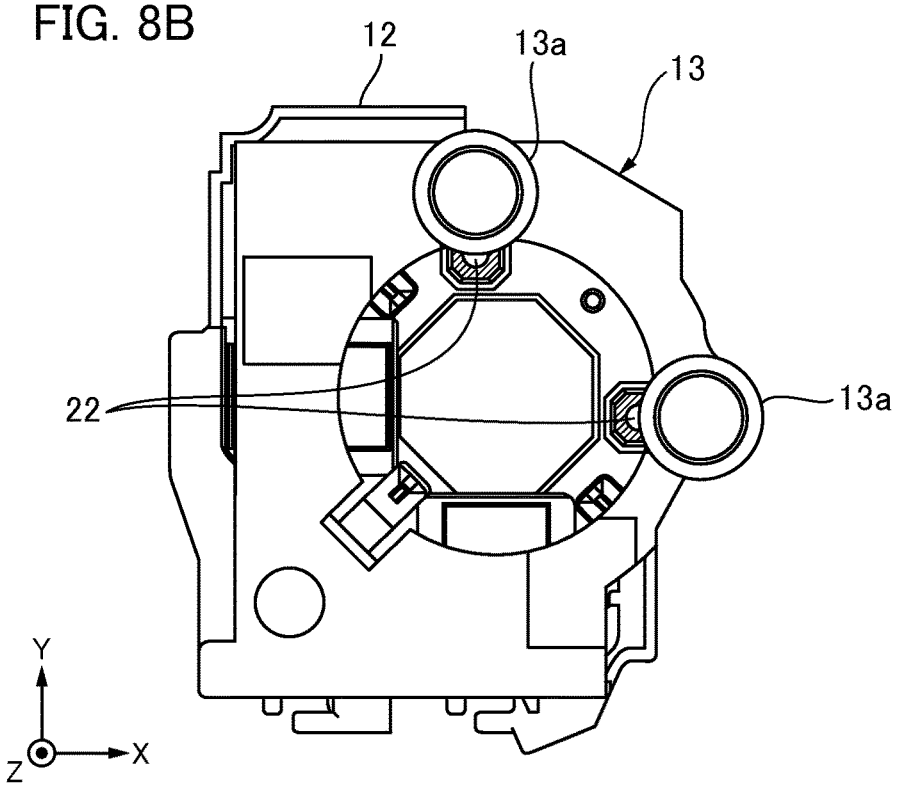

FIG. 8A and FIG. 8B are plan views illustrating the positional relationship in the optical axis direction of the damping member 15 and a ball regulating unit 12a configured to regulate the movable range of the ball 22 formed on the shift base lens barrel 12 when seen from the imaged body side. In particular, FIG. 8A illustrates the arrangement of the ball regulating unit 12a in the shift base lens barrel 12 in a configuration in which the damping member mounting unit 13 is not assembled. FIG. 8B illustrates the mounting arrangement of the damping member mounting unit 13 on the shift base lens barrel 12 in relation to FIG. 8A. The range illustrated by the hatching in relation to the ball regulating units 12a at three positions in FIG. 8A illustrates the plane of movement of the ball 22. In the present embodiment, as described above, in a configuration in which the ball 22 is disposed on the image plane side of the shift lens barrel 11, and the damping member 15 is disposed on the imaged body side of the shift lens barrel 11, the ball regulating unit 12a overlaps in the optical axis direction with at least a portion of the installation region of the damping member 15 in the cylindrical unit 13a. In this context, the disposition of the ball regulating unit 12a in the shift base lens barrel 12, that is to say, the disposition of the ball 22, as illustrated in FIG. 8A, may not be necessarily configured with an equal distance relative to the position of the shift lens L2 (not illustrated). The disposition of the ball 22 in the present embodiment coincides with the disposition of the drive unit as illustrated in the respective drive magnets 18a, 18b in the shift base lens barrel 12.

As discussed above, the image shake correction apparatus 10 configures the disposition (installation position) of the damping member 15 and the ball 22 as described above on the premise that the damping member 15 is installed. When a conventional image shake correction apparatus is configured by installing the coil spring 21 in a coaxial arrangement in relation to the optical axis direction in order to prevent an increase in the size of the drive unit, the space required in relation to the diameter is increased in order to avoid an interference with other constituent elements (constituent components). In contrast, the image shake correction apparatus 10 according to the present embodiment avoids interference with other constituent elements even when the three coil springs 21 are disposed coaxially to the optical axis direction as a result of the disposition of the damping member 15 and the ball 22. Therefore, the image shake correction apparatus 10 maintains correction accuracy while enabling minimization of the space required in relation to the diameter.

As described above, according to the present embodiment, an image shake correction apparatus can be provided that is useful to reduce dimensions in relation to the diameter. Furthermore, an optical device can be provided that is useful to reduce dimensions in relation to the diameter by mounting the image shake correction apparatus on the lens barrel, and applying to a conversion lens unit or imaging apparatus such as a video camera, digital still camera or the like.

In the present embodiment, although the ball regulating unit 12a is provided on the shift base lens barrel 12, and the contact surface 11b is provided on the shift lens barrel 11, that configuration may be reversed by provision of the contact surface on the shift base lens barrel 12, and the provision of the ball regulating unit 12a on the shift lens barrel 11. In addition, although the coil spring 21 is disposed at three positions in the present embodiment, there is no limitation in relation to the number of installed positions, and for example, the coil springs 21 may only be installed at one position as long as that position is within the range of inside the triangle formed by connection of the three balls 22. Furthermore, in the present embodiment, the coil spring 21 is installed between the shift base lens barrel 12 and the shift lens barrel 11, and the shift base lens barrel 12 and the shift lens barrel 11 are biased in a direction in which the barrels approach one another. In this regard, a configuration is possible in which the yoke is disposed at a position in proximity to the drive coils 17a, 17b, for example, a position in which the drive coils 17a, 17b are sandwiched on the opposite side to the optical axis direction of the drive magnets 18a, 18b. In this configuration, the shift base lens barrel 12 and the shift lens barrel 11 may be biased in a direction in which the barrels approach one another by a magnetic attractive force that acts between the yoke and the drive magnets 18a, 18b.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222850 filed Oct. 5, 2012 which is hereby incorporated by reference herein in its entirety.

What is claimed is:

1. An image vibration correction apparatus, the apparatus comprising:
   a first fixing member;
   a second fixing member;
   a movable member holding an optical element and configured to reduce image vibration by moving in a direction different from a direction of an optical axis relative to the first fixing member, and to be disposed between the first fixing member and the second fixing member; and
   a spherical member that is movable being between the first fixing member and the movable member;
   wherein the second fixing member has a damping member configured to attenuate vibration resulting from movement of the movable member by connection with a portion of the movable member, wherein the movable member includes a contact surface configured to make contact with the spherical member, wherein, when viewed from the direction of the optical axis, the maximum movable range of the contact surface overlaps with at least a portion of an installation region of the damping member, wherein, when viewed from the direction of the optical axis, a center of the contact surface is positioned further outside than a center of the optical element, and the installation region of the damping member is positioned further outside than the center of the contact surface, and wherein, when the image vibration correction apparatus is viewed from a side of the first fixing member on the direction of the optical axis, at least a part of the damping member is exposed.

2. The image vibration correction apparatus according to claim 1, wherein either one of the first fixing member or the movable member includes a regulating unit configured to regulate the movable range of the spherical member, and wherein the movable range of the spherical member that is regulated by the regulating unit overlaps with at least a portion of the installation region of the damping member in the direction of the optical axis.

3. The image vibration correction apparatus according to claim 1, wherein three spherical members are disposed in the periphery of the optical element within a plane that is orthogonal to the optical axis, and wherein the maximum movable range of the contact surface or the movable range of the spherical member overlaps with at least a portion of the installation region of the damping member in the direction of the optical axis relative to two of the three spherical members.

4. The image vibration correction apparatus according to claim 2, wherein three spherical members are disposed in the periphery of the optical element within a plane that is orthogonal to the optical axis, and wherein the maximum movable range of the contact surface or the movable range of the spherical member overlaps with at least a portion of the installation region of the damping member in the direction of the optical axis relative to two of the three spherical members.

5. An optical device including an optical system configured from a plurality of optical elements, wherein the optical system includes an image vibration correction apparatus, wherein the image vibration correction apparatus comprising:

a first fixing member;

a second fixing member;

a movable member holding an optical element and configured to reduce image vibration by moving in a direction different from a direction of an optical axis relative to the first fixing member, and to be disposed between the first fixing member and the second fixing member; and a spherical member that is movable being between the first fixing member and the movable member;

wherein the second fixing member has a damping member configured to attenuate vibration resulting from movement of the movable member by connection with a portion of the movable member, wherein the movable member includes a contact surface configured to make contact with the spherical member, wherein, when viewed from the direction of the optical axis, the maximum movable range of the contact surface overlaps with at least a portion of an installation region of the damping member, wherein, when viewed from the direction of the optical axis, a center of the contact surface is positioned further outside than a center of the optical element, and the installation region of the damping member is positioned further outside than the center of the contact surface, and wherein, when the image vibration correction apparatus is viewed from a side of the first fixing member on the direction of the optical axis, at least a part of the damping member is exposed.

6. An image vibration correction apparatus, the apparatus comprising:

a first fixing member;

a second fixing member;

a movable member holding an optical element and configured to reduce image vibration by moving in a direction different from a direction of an optical axis relative to the first fixing member, and to be disposed between the first fixing member and the second fixing member; and a spherical member that is movable being between the first fixing member and the movable member; and the movable member includes a contact surface configured to make contact with the spherical member;

wherein the second fixing member has a damping member configured to attenuate vibration resulting from movement of the movable member by connection with a portion of the movable member, wherein, when viewed from the direction of the optical axis, a maximum movable range of the contact surface overlaps with at least a portion of an installation region of the damping member, and wherein, when the image vibration correction apparatus is viewed from a side of the first fixing member on the direction of the optical axis, at least a part of the damping member is exposed.

7. An optical device including an optical system configured from a plurality of optical elements, wherein the optical system includes an image vibration correction apparatus, wherein the image vibration correction apparatus comprising:

a first fixing member;

a second fixing member;

a movable member holding an optical element and configured to reduce image vibration by moving in a direction different from a direction of an optical axis relative to the first fixing member, and to be disposed between the first fixing member and the second fixing member; and a spherical member that is movable being between the first fixing member and the movable member; and the movable member includes a contact surface configured to make contact with the spherical member;

wherein the second fixing member has a damping member configured to attenuate vibration resulting from movement of the movable member by connection with a portion of the movable member, wherein, when viewed from the direction of the optical axis, the maximum movable range of the contact surface overlaps with at least a portion of an installation region of the damping member, and wherein, when the image vibration correction apparatus is viewed from a side of the first fixing member on the direction of the optical axis, at least a part of the damping member is exposed.

* * * * *